United States Patent
Chari et al.

(10) Patent No.: US 10,341,372 B2
(45) Date of Patent: Jul. 2, 2019

(54) CLUSTERING FOR DETECTION OF ANOMALOUS BEHAVIOR AND INSIDER THREAT

(71) Applicant: International Business Machines Corporation, Armonk, NY (US)

(72) Inventors: Suresh Chari, Scarsdale, NY (US); Benjamin Edwards, Yorktown Heights, NY (US); Taesung Lee, White Plains, NY (US); Ian M. Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 15/619,598

(22) Filed: Jun. 12, 2017

(65) Prior Publication Data
US 2018/0359270 A1    Dec. 13, 2018

(51) Int. Cl.
*H04L 29/06*    (2006.01)
(52) U.S. Cl.
CPC .................. *H04L 63/1425* (2013.01)
(58) Field of Classification Search
CPC .................................................. H04L 63/1425
USPC ............................................................. 726/23
See application file for complete search history.

(56) References Cited

U.S. PATENT DOCUMENTS

| | | | |
|---|---|---|---|
| 7,523,016 B1 * | 4/2009 | Surdulescu | G06F 21/316 |
| | | | 702/185 |
| 9,112,895 B1 * | 8/2015 | Lin | H04L 63/1416 |
| 9,258,217 B2 | 2/2016 | Duffield et al. | |
| 9,537,880 B1 * | 1/2017 | Jones | H04L 63/1425 |
| 9,727,723 B1 * | 8/2017 | Kondaveeti | G06F 21/50 |
| 2006/0242694 A1 | 10/2006 | Gold et al. | |
| 2006/0265748 A1 * | 11/2006 | Potok | G06F 21/552 |
| | | | 726/23 |
| 2012/0304288 A1 * | 11/2012 | Wright | G06F 21/552 |
| | | | 726/22 |
| 2013/0305357 A1 | 11/2013 | Ayyagari et al. | |
| 2015/0067835 A1 | 3/2015 | Chari et al. | |
| 2015/0067845 A1 * | 3/2015 | Chari | G06F 21/50 |
| | | | 726/23 |
| 2015/0135320 A1 | 5/2015 | Coskun | |
| 2015/0326594 A1 * | 11/2015 | Chari | H04L 67/303 |
| | | | 726/23 |

(Continued)

FOREIGN PATENT DOCUMENTS

WO    WO2008121945 A2    10/2008

*Primary Examiner* — Khalil Naghdali
(74) *Attorney, Agent, or Firm* — Yee & Associates, P.C.; Jeffrey LaBaw

(57) ABSTRACT

Detecting anomalous user behavior is provided. User activity is logged for a set of users. The user activity is divided into distinct time intervals. For each distinct time interval, logged user activity is converted to a numerical representation of each user's activities for that distinct time interval. A clustering process is used on the numerical representations of user activities to determine which users have similar activity patterns in each distinct time interval. A plurality of peer groups of users is generated based on determining the similar activity patterns in each distinct time interval. Anomalous user behavior is detected based on a user activity change in a respective peer group of users within a distinct time interval.

18 Claims, 7 Drawing Sheets

(56) References Cited

U.S. PATENT DOCUMENTS

| | | | | |
|---|---|---|---|---|
| 2015/0341376 | A1* | 11/2015 | Nandy | H04L 63/1408 |
| | | | | 726/23 |
| 2016/0191560 | A1* | 6/2016 | Pegna | G06F 21/552 |
| | | | | 726/23 |
| 2018/0089272 | A1* | 3/2018 | Bath | G06F 3/0481 |
| 2018/0316707 | A1* | 11/2018 | Dodson | H04L 63/1425 |

* cited by examiner

TO FIG. 3B

CLUSTERING FOR DETECTION OF ANOMALOUS BEHAVIOR AND INSIDER THREAT

BACKGROUND

1. Field

The disclosure relates generally to network security monitoring for threat detection and more specifically to detecting anomalous user behavior in a network based on clustering numerical representations of user activities into peer groups of users performing similar types of activities during a defined interval of time.

2. Description of the Related Art

Networks allow computers to communicate with one another whether via a public network (e.g., the Internet) or a private network (e.g., an intranet). Many enterprises have internal private networks to handle communication throughout their respective enterprises. Managing these networks is increasingly difficult and costly. One task of managing these networks is detecting and dealing with malicious user activity and insider threats.

For example, a user may access a network to perform malicious activities, which may compromise secure resources connected to the network. Such malicious activities may include, for example, data theft (i.e., seizure of confidential information), data corruption, data deletion, and the like. User activity may be tracked and stored in system logs. A system log may store information that records events corresponding to user activities.

Current approaches for identifying malicious user behavior within system logs are based on fixed rules, statistical models, or machine learning approaches. Rule-based approaches are rigid and unable to adapt to new technologies and practices. For example, because rule-based approaches are restricted to identifying known patterns, rule-based approaches will not detect behavior that does not fit these known patterns. Statistical and machine learning approaches can only detect shifts in individual user behavior patterns between time periods. These shifts in behavior or new behaviors may be common occurrences as individual users or teams of users alternate between tasks, causing statistical and machine learning approaches to generate a large number of false positive alerts regarding malicious user behavior. A legitimate user activity that is included in an alert, which indicates malicious user behavior, is a false positive. When too many false positives are issued, security analysts may ignore or miss legitimate malicious user behavior alerts.

SUMMARY

According to one illustrative embodiment, a computer-implemented method for detecting anomalous user behavior is provided. A computer logs user activity for a set of users. The computer divides the user activity into distinct time intervals. For each distinct time interval, the computer converts logged user activity to a numerical representation of each user's activities for that distinct time interval. The computer uses a clustering process on the numerical representations of user activities to determine which users have similar activity patterns in each distinct time interval. The computer generates a plurality of peer groups of users based on determining the similar activity patterns in each distinct time interval. The computer detects anomalous user behavior based on a user activity change in a respective peer group of users within a distinct time interval. According to other illustrative embodiments, a computer system and computer program product for detecting anomalous user behavior are provided.

DETAILED DESCRIPTION

Figure 1:
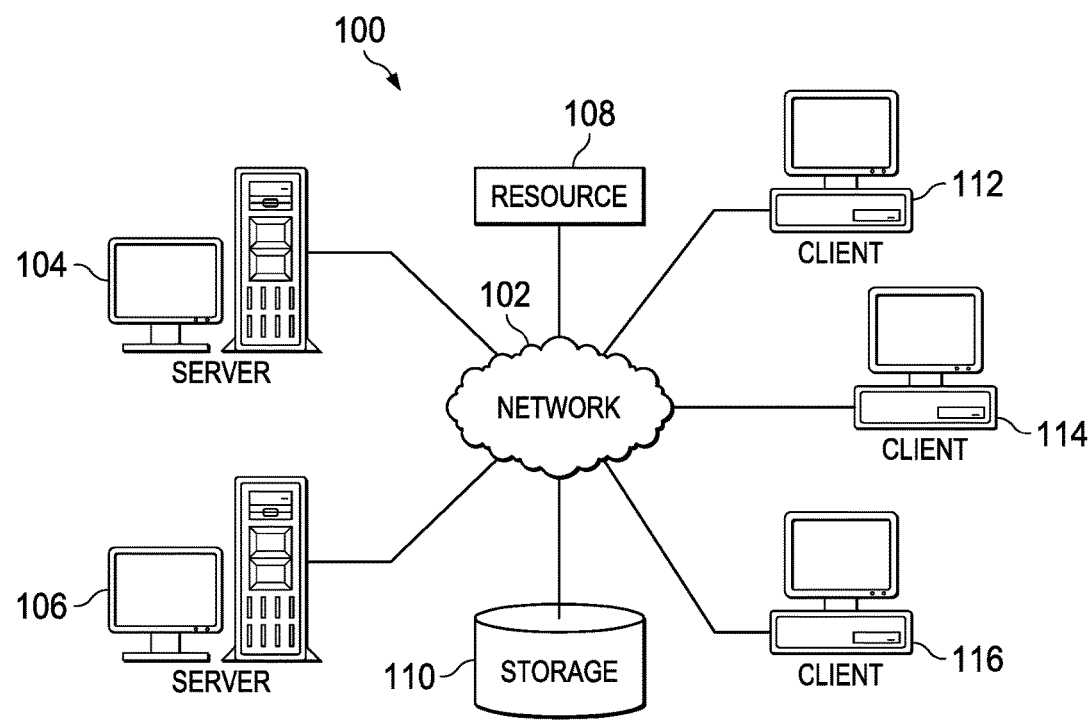
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
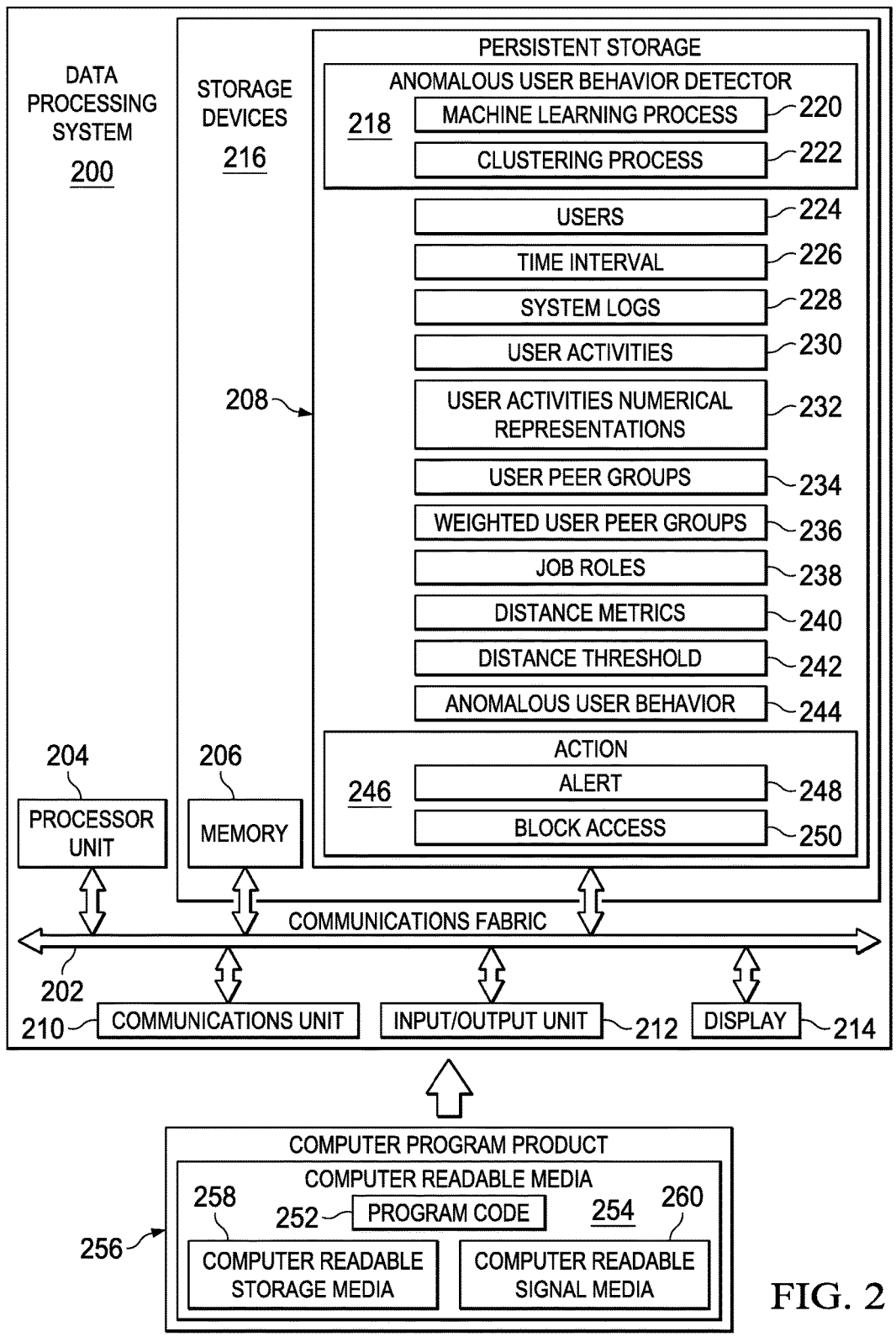
FIG. 2 is a diagram of a data processing system in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104, server 106, and resource 108 connect to network 102, along with storage 110. Server 104 and server 106 may be, for example, server computers with high-speed connections to network 102. In addition, server 104 and server 106 protect resource 108. In other words, server 104 and server 106 restrict access to resource 108 by requiring user authentication, such as, for example, a valid username and password combination, to access resource 108. Resource 108 may be, for example, a secure enterprise resource, such as a secure network, a secure device, a secure application, a secure document, and the like. Further, resource 108 may represent a plurality of secure resources.

Furthermore, server 104 and server 106 also provide a service for detecting anomalous user behavior in network data processing system 100 based on clustering numerical representations of user activities, which may include a machine learning method to learn one or more numbers that best represent the user activities and their results, into peer groups of users having similar patterns of activities within a defined time interval, such as a day or 24-hour time period. Moreover, server 104 and server 106 may each represent a plurality of servers hosting different anomalous user behavior detection services.

Client 112, client 114, and client 116 also connect to network 102. In this example, clients 112, 114, and 116 are illustrated as desktop or personal computers. However, it should be noted that clients 112, 114, and 116 may represent other types of data processing systems, such as, for example, smart phones, smart watches, handheld computers, laptop computers, personal digital assistants, and the like, with wired or wireless communication links to network 102. Users of clients 112, 114, and 116 may utilize clients 112, 114, and 116 to access resource 108 and perform other activities on network 102. In addition, clients 112, 114, and 116 record the activities performed by their respective users in system logs and transmit the system logs to server 104 or server 106 for processing and analysis for detection of anomalous behavior by one or more users.

Storage 110 is a network storage device capable of storing any type of data in a structured format or an unstructured format. In addition, storage 110 may represent a plurality of network storage devices. Further, storage unit 110 may store, for example, lists of client device users, job roles corresponding to the client device users, system logs, lists of user peer groups, and the like. Furthermore, storage unit 110 may store other information, such as authentication or credential data that may include user names, passwords, and biometric data associated with the client device users, security analysts, and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 112 over network 102 for use on client 112.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor devices, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores anomalous user behavior detector 218. However, it should be noted that even though anomalous user behavior detector 218 is illustrated as residing in persistent storage 208, in an alternative illustrative embodiment anomalous user behavior detector 218 may be a separate component of data processing system 200. For example, anomalous user behavior detector 218 may be a hardware component coupled to communication fabric 202 or a combination of hardware and software components.

Anomalous user behavior detector 218 identifies anomalous behavior of client device users based on clustering numerical features extracted from activities performed by the client device users into peer groups of users performing similar activities within a defined interval of time. In this example, anomalous user behavior detector 218 includes machine learning process 220 and clustering process 222. Anomalous user behavior detector 218 utilizes machine learning process 220 to learn and generate numerical representations of users' activities for each respective interval of time. Machine learning component 220 may be any algorithm that takes unstructured system log data and returns a numerical representation of user activity. In other words, machine learning component 220 is a program that can, in general, learn behavior models and then use these models to score user activity. Anomalous user behavior detector 218 utilizes clustering process 222 to cluster the generated numerical representations of users' activities for each respective interval of time to form a plurality of peer groups of users performing similar patterns of activities or tasks in a network of data processing systems during each respective interval of time. These common activity patterns in a peer group reflect users with similar job roles performing common tasks.

Also in this example, persistent storage 208 stores users 224, time interval 226, system logs 228, user activities 230, user activities numerical representations 232, user peer groups 234, weighted user peer groups 236, job roles 238, distance metrics 240, distance threshold 242, anomalous user behavior 244, and action 246. Users 224 represent a list of a plurality of different client device users. Users 224 may be, for example, employees of an enterprise.

Time interval 226 represents a predefined period of time, such as, for example, one day, one week, or one month, or finer grained time intervals, such as, for example, hours. Anomalous user behavior detector 218 utilizes time interval 226 to segment or divide system logs 228 into discrete time periods. Anomalous user behavior detector 218 passively receives and/or actively retrieves system logs 228 from a plurality of different client devices corresponding to users 224. System logs 228 represent any type of log that records user activities 230. User activities 230 represent the activities or tasks performed by users 224 within a network of data processing systems, such as network data processing system 100 in FIG. 1, during each respective time interval 226.

Anomalous user behavior detector 218 utilizes machine learning process 220 to generate user activities numerical representations 232. User activities numerical representations 232 represent a numerical representation, such as a numeric feature vector, for each user activity in user activities 230 that corresponds to each user in users 224. Anomalous user behavior detector 218 utilizes clustering process 222 to cluster user activities numerical representations 232 into user peer groups 234. Clustering process 222 may include a machine learning method to learn one or more numbers that best represent the user activities and their results. User peer groups 234 represent a plurality of different peer groups of users, each different peer group of users performing a similar set of activities within the network of data processing systems during a respective time interval.

Anomalous user behavior detector 218 also may optionally generate weighted user peer groups 236. Weighted user peer groups 236 represent a plurality of different peer groups of users that include a weighted value based on, for example, a percentage of time each different user in users 224 is included in one or more user peer groups over a predetermined number of time intervals. Anomalous user behavior detector 218 maps user peer groups 234 of similar activity patterns to job roles 238. Job roles 238 represent different roles within the enterprise assigned to different users in users 224. A job role may be, for example, a software developer for the enterprise.

Anomalous user behavior detector 218 utilizes distance metrics 240 to compare the membership of a user's peer group in a current time interval to the membership of that user's peer group in an immediately preceding time interval or the membership of that user's peer groups over a predetermined number of previous time intervals. For example, distance metrics 240 may increase when a user's peer group in a current time interval contains more users, less users, different users, or some combination therein than in previous time intervals. If one or more distance metrics 240 corresponding to the user's peer group in the current time interval are greater than or equal to distance threshold 242, then anomalous user behavior detector 218 identifies anomalous user behavior 244. Distance threshold 242 represents a predefined or inferred threshold value for the distance metrics. In other words, anomalous user behavior detector 218 may learn the distance threshold in the same time frame as the peer groups are inferred. Anomalous user behavior 244 represents behavior of one or more users that indicates a security threat to one or more secure resources of the enterprise. In response to anomalous user behavior detector 218 detecting anomalous user behavior 244, anomalous user behavior detector 218 performs action 246. Action 246 represents a set of one or more actions taken by anomalous user behavior detector 218 in response to detecting anomalous user behavior 244. The set of actions may be, for example, alert 248 and block access 250. Alert 248 represents a notification that anomalous user behavior detector 218 sends to a security analyst of the enterprise regarding anomalous user behavior 244. Block access 250 represents anomalous user behavior detector 218 denying or preventing access to one or more secure resources of the enterprise by the one or more users corresponding to anomalous user behavior 244.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, near field communication (NFC), Wi-Fi, Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 252 is located in a functional form on computer readable media 254 that is selectively removable and may be loaded onto or transferred to data processing system 200 for running by processor unit 204. Program code 252 and computer readable media 254 form computer program product 256. In one example, computer readable media 254 may be computer readable storage media 258 or computer readable signal media 260. Computer readable storage media 258 may include, for example, an optical or magnetic disc that is inserted or placed into a drive or other device that is part of persistent storage 208 for transfer onto a storage device, such as a hard drive, that is part of persistent storage 208. Computer readable storage media 258 also may take the form of a persistent storage, such as a hard drive, a thumb drive, or a flash memory that is connected to data processing system 200. In some instances, computer readable storage media 258 may not be removable from data processing system 200.

Alternatively, program code 252 may be transferred to data processing system 200 using computer readable signal media 260. Computer readable signal media 260 may be, for example, a propagated data signal containing program code 252. For example, computer readable signal media 260 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 252 may be downloaded over a network to persistent storage 208 from another device or data processing system through computer readable signal media 260 for use within data processing system 200. For instance, program code stored in a computer readable storage media in a data processing system may be downloaded over a network from the data processing system to data processing system 200. The data processing system providing program code 252 may be a server computer, a client computer, or some other device capable of storing and transmitting program code 252.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 258 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments detect anomalous user behavior in data processing systems, which is indicative of a threat to sensitive resources by an outside entity or an internal user within an enterprise, while eliminating or reducing false positive alerts regarding anomalous user behavior. Illustrative embodiments detect anomalous user behavior by learning which users have similar behavior and adapting to new user behavior. Illustrative embodiments uncover anomalous user behavior based on the patterns of activities a user or a peer group of users are performing during a defined time interval. In addition, illustrative embodiments detect changes in user behavior when a team of users are assigned to a new task or project and changes to their respective job roles. Further, illustrative embodiments generate clusters of user activity patterns, map the user activity pattern clusters to job roles, and utilize the job roles as one type of numerical representation of user behavior to build peer groups of users.

Illustrative embodiments log activity of each user in the data processing systems and divide the logged user activity into defined time intervals. Illustrative embodiments convert each time interval of logged user activity to numerical representations of users' activities for a respective time interval. Illustrative embodiments may accomplish this conversion using a variety of machine learning techniques. After conversion of user activity to numerical representations, illustrative embodiments utilize a clustering process on the numerical representations of user activity to determine which users have similar patterns of activity in each time period. Illustrative embodiments classify users to peer groups based on which users are performing similar patterns of activities. Anomalous user behavior manifests itself as a change in a peer group of users. For example, when a user leaves a peer group of users or a new user joins a peer group of users within a defined time interval, illustrative embodiments may detect this change to a peer group of users as anomalous behavior by the user leaving the peer group or the new user joining the peer group. As another example, illustrative embodiments may detect anomalous behavior when a member of one peer group of users starts performing activity patterns corresponding to a different peer group of users within the same defined time interval.

Illustrative embodiments utilize the machine learning process to transform activity patterns corresponding to a set of client device users to numeric feature vectors for each individual user in the set of client device users. The set of client device users may be, for example, all or a portion of employees associated with an enterprise. A numeric feature vector represents a user's activity patterns (i.e., job role) for some defined interval of time, such as, for example, a day, a week, two weeks, a month, or any other finer or coarser increment of time. For example, each vector may represent the volume of activity in any number of categories, inferred latent variables discovered through a different machine learning process, transition probabilities between sequential activities, or some combination thereof. Illustrative embodiments train the machine learning process during a period when illustrative embodiments assume that no malicious user activity exists within the data processing systems. This step results in generating a numeric feature vector that represents user activity for each user in each defined time interval. It should be noted that different illustrative embodiments may utilize different machine learning processes. For example, the different illustrative embodiments may utilize Token Frequency/Inverse Document Frequency, Latent Dirichlet Allocation, Markov Chain Activity, Deep Machine Learning, or any combination thereof.

Token Frequency/Inverse Document Frequency treats different types of activity as tokens in a document and measures their relative frequency over all activity. Illustrative embodiments utilize these measurements as a numeric feature vector. Latent Dirichlet Allocation treats system logs as a bag of words and derives semantic topics from the words. Illustrative embodiments utilize the distribution of words over the semantic topics as a numeric feature vector. Markov Chain Activity measures transitions between different user activities in system logs and records probabilities of transitions between user activities. Illustrative embodiments utilize these probabilities as a numeric feature vector. Deep Machine Learning utilizes user activity captured in system logs to train a recurrent neural network that generates numeric feature vectors for individual documents, which preserves similarity between different documents.

Each of these machine learning processes produce a numeric representation of user activity. Illustrative embodiments map these numeric representations of user activity to specific patterns of user activities within an enterprise. User activity patterns reflect job roles or collections of job roles, and these activity patterns are what illustrative embodiments cluster on. In other words, illustrative embodiments cluster user activity patterns, and that these activity pattern clusters reflect job roles. User activity patterns represent common user activities, which may be shared by multiple users. Illustrative embodiments utilize the generated numeric feature vectors as input to the clustering process. It should be noted that different illustrative embodiments may utilize any number of clustering processes to identify different peer groups of users performing similar patterns of activity. For example, the different illustrative embodiments may utilize K-Means Clustering, Gaussian Mixture Models, or a combination thereof.

K-Means Clustering defines a fixed set of clusters, which include a set of points in the space that can act as average values for each cluster. The point nearest a user defines the user's peer group. Gaussian Mixture Models define a fixed set of Gaussian distributions over the data and then select the distribution with the highest likelihood of membership as a user's peer group.

After illustrative embodiments define these clusters of different user peer groups, illustrative embodiments detect user behavior anomalies by looking for changes in respective user peer groups. Specifically, from one defined time interval to the next defined time interval, if illustrative embodiments find a user's peer group to contain users "A", "B", and "C" at one time interval and at the next time interval the user's peer group contains users "X", "B", and "Z", then illustrative embodiments measure the user change in peer groups using a distance metric, such as, for example, a Jaccard Distance value. The Jaccard Distance measures dissimilarity between two user peer groups and may be obtained by subtracting the Jaccard Coefficient from 1 or by dividing the difference of the sizes of the union and the intersection of the two user peer groups by the size of the union of the two user peer groups. In the example above, this would be 1-|"A"|/|"A","B","C","X","Z"|=1-⅕=0.8.

As a result, if an enterprise assigns an entire peer group of users to a new set of activities or tasks, then illustrative embodiments will not generate anomalous behavior alerts for users in that peer group. Instead, illustrative embodiments detect that the peer group of users remains the same, despite the change to the new set of activities, and do not generate false positive anomalous user behavior alerts. Illustrative embodiments may then suppress other alerts and actions generated by different systems, which identify this change in activity pattern.

Figure 3A:
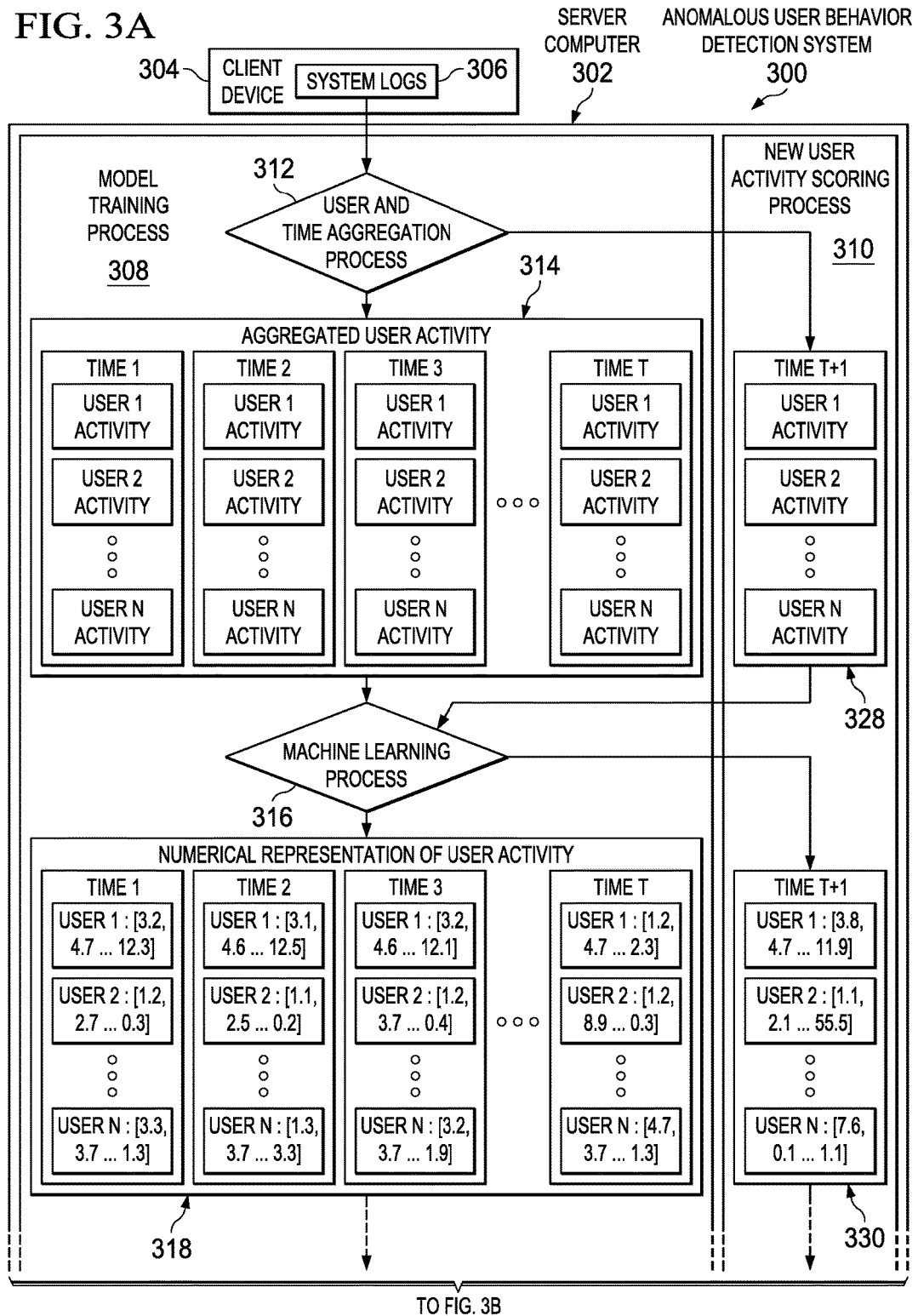
FIGS. 3A-3C are a diagram illustrating an example of an anomalous user behavior detection system in accordance with an illustrative embodiment.
Figure 3B:
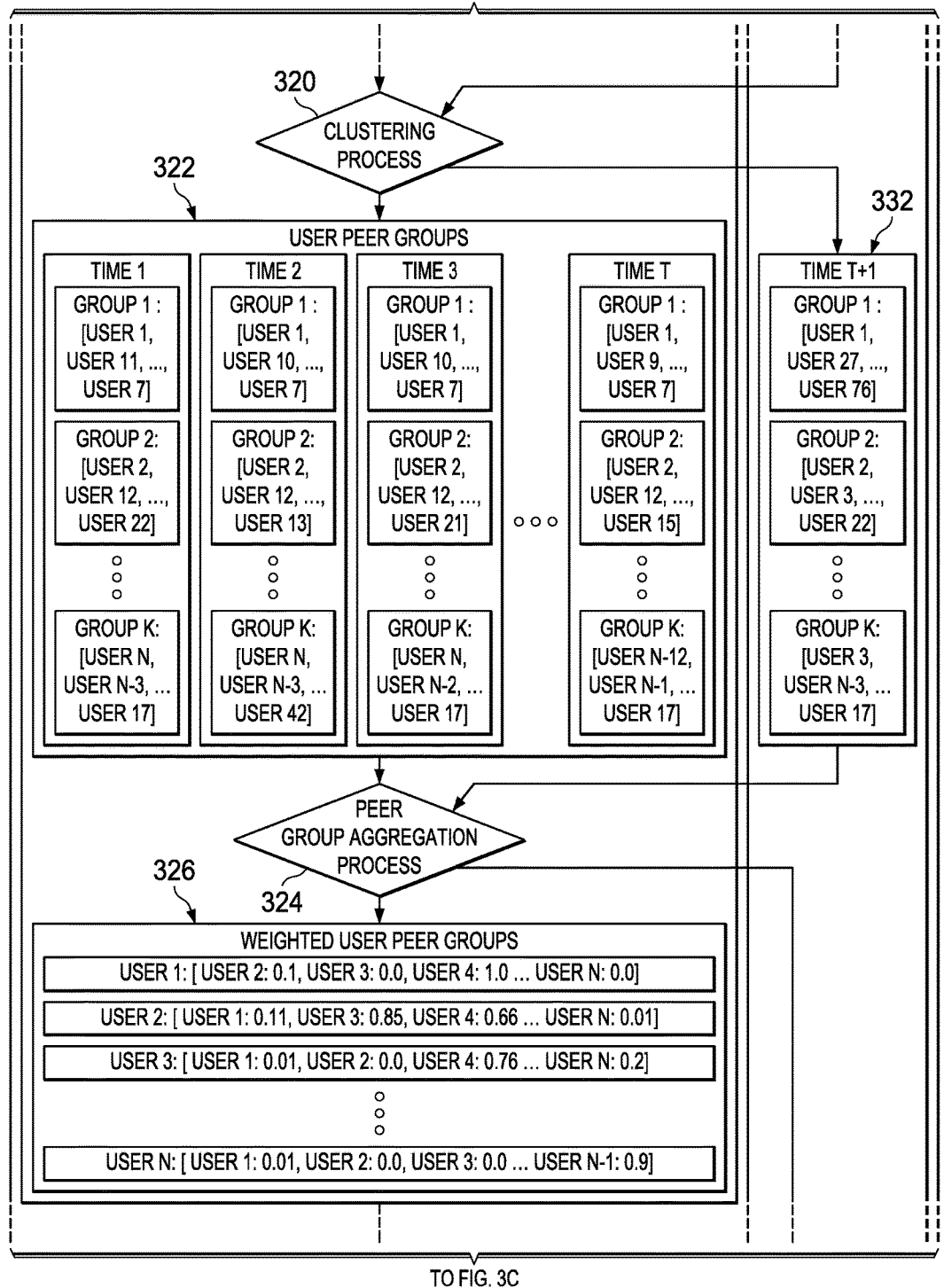
Figure 3C:
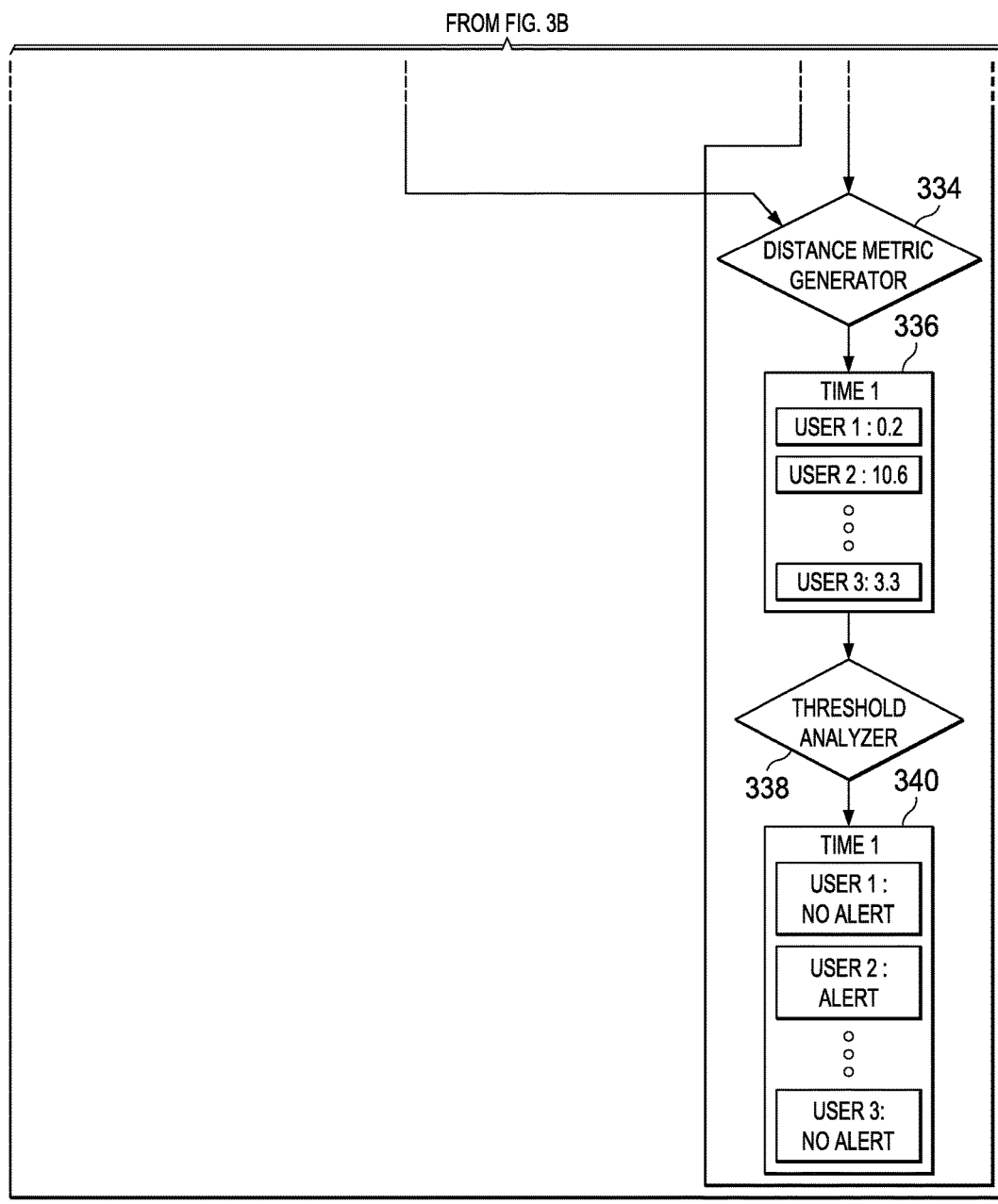

With reference now to FIGS. 3A-3C, a diagram illustrating an example of an anomalous user behavior detection system is depicted in accordance with an illustrative embodiment. Anomalous user behavior detection system 300 is a system of software and hardware components for automatically detecting anomalous user behavior in a network based on clustering numerical representations of user activities into peer groups of users having similar types of activities within a defined time interval. Anomalous user behavior detection system 300 may be implemented in a network of data processing systems, such as network data processing system 100 in FIG. 1.

In this example, anomalous user behavior detection system 300 includes server computer 302 and client device 304. However, it should be noted that anomalous user behavior detection system 300 is only meant as an example and not as a limitation on illustrative embodiments. In other words, anomalous user behavior detection system 300 may include any number of server computers, client devices, and other devices not shown.

Server computer 302 may be, for example, server 104 in FIG. 1 or data processing system 200 in FIG. 2. Client device 304 may be, for example, client 110 in FIG. 1. Also, client device 304 may represent a plurality of client devices connected to server computer 302 via a network, such as network 102 in FIG. 1.

In this example, server computer 302 receives system logs 306 from client device 304. Server computer 302 may utilize model training process 308 or new user activity scoring process 310 to process and analyze system logs 306. System logs 306 may be, for example, system logs 228 in FIG. 2.

Model training process 308 utilizes user and time aggregation process 312 to generate aggregated user activity 314 from data contained within system logs 306. Aggregated user activity 314 represents a plurality of different user activities in each time interval. In this example, aggregated user activity 314 represents user 1 activity, user 2 activity, . . . , and user N activity within each of time interval 1, time interval 2, time interval 3, . . . , and time interval T.

Then, model training process 308 utilizes machine learning process 316 to generate numerical representation of user activity 318 for each user activity in aggregated user activity 314. Machine learning process 316 may be, for example, machine learning process 220 in FIG. 2. Further, model training process 308 utilizes clustering process 320 to cluster numerical representations in numerical representation of user activity 318 based on similar activities performed by the different users during each respective time interval to form user peer groups 322. Clustering process 320 may be, for example, clustering process 222 in FIG. 2. User peer groups 322 may be, for example, user peer groups 234 in FIG. 2. Furthermore, model training process 308 may optionally utilize peer group aggregation process 324 to generate weighted user peer groups 326. Weighted user peer groups 326 may be, for example, weighted user peer groups 236 in FIG. 2.

At 328, new user activity scoring process 310 receives user activity within a current time interval (e.g., time interval T+1), which user and time aggregation process 312 extracts from system logs 306. New user activity scoring process 310 utilizes machine learning process 316 to generate a numeric representation, such as a numeric feature vector, for each user activity within the current time interval at 330. New user activity scoring process 310 utilizes clustering process 320 to cluster the numeric representations of user activities in the current time interval to form different peer groups of users performing similar activities during the current time interval at 332.

New user activity scoring process 310 utilizes distance metric generator 334 to generate distance metrics for each user in the different user peer groups in the current time interval T+1 at 336. Distance metric generator 334 generates the distance metrics based on comparing the position of each user in the different user peer groups in the current time interval T+1 with the position of the same users in user peer groups during the immediately preceding time interval (e.g., T) or the position of the same users in user peer groups over a predetermined number of preceding time intervals (e.g., time intervals 1, 2, 3, . . . , T).

New user activity scoring process 310 utilizes threshold analyzer 338 to determine whether any of the generated distance metrics for the current time interval meets or exceeds a predefined distance threshold value at 340. The predefined distance threshold value may be, for example, distance threshold 242 in FIG. 2. If threshold analyzer 338 determines that one or more generated distance metrics for the current time interval meets or exceeds the predefined or inferred distance threshold value, then threshold analyzer 338 issues an anomalous user behavior alert to a security analyst. In this example, threshold analyzer 338 issues an anomalous behavior alert for user 2. Further, new user activity scoring process 310 may block or deny user 2 access to secure resources connected to the enterprise network during security analyst review of the alert.

Figure 4:
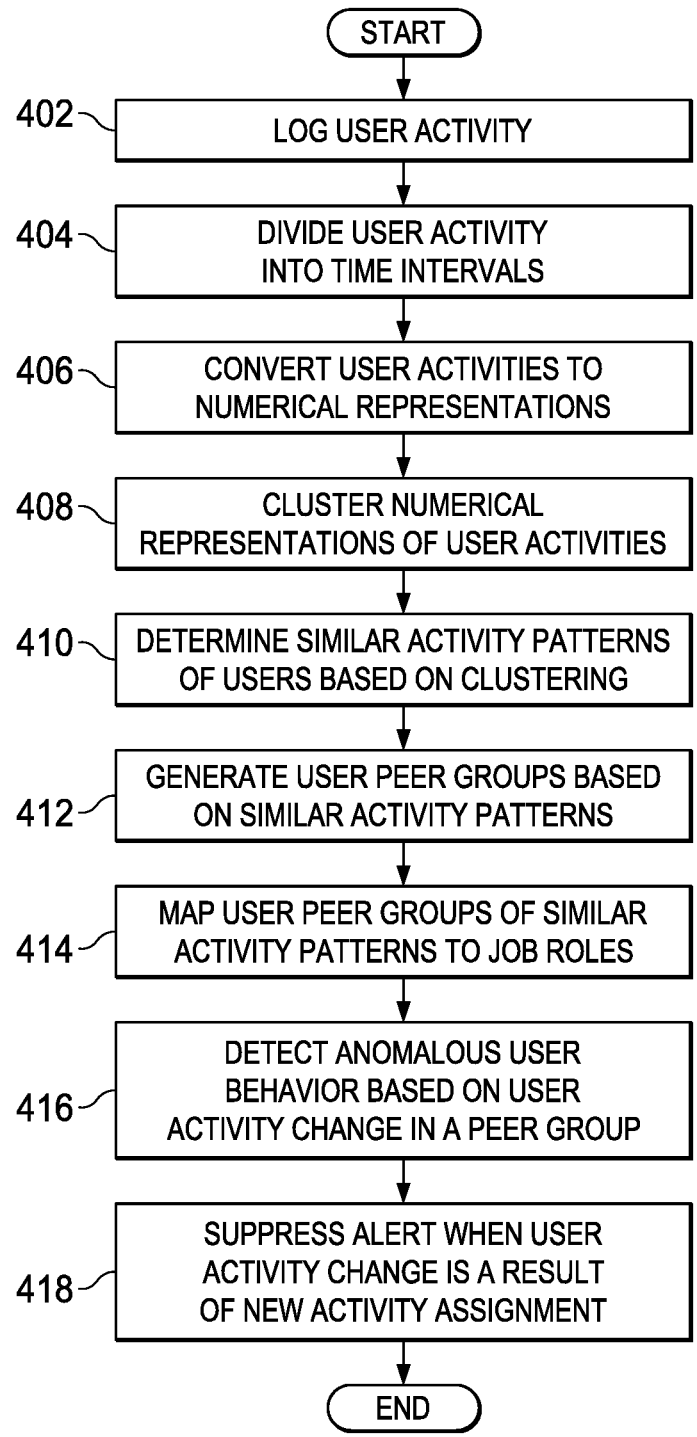
FIG. 4 is a flowchart illustrating a process for detecting anomalous user behavior in accordance with an illustrative embodiment.

With reference now to FIG. 4, a flowchart illustrating a process for detecting anomalous user behavior is shown in accordance with an illustrative embodiment. The process shown in FIG. 4 may be implemented in a computer, such as, for example, server 104 in FIG. 1 or data processing system 200 in FIG. 2.

The process begins when the computer logs user activity for each user in a set of users (step 402). In addition, the computer divides logged the user activity into distinct time intervals (step 404). A distinct time interval may be, for example, one day. Further, for each distinct time interval, the computer converts the logged user activity to a numerical representation of each user's activities for that distinct time interval (step 406).

Afterward, the computer uses a clustering process on the numerical representations of user activities (step 408). The computer determines which users have similar activity patterns in each distinct time interval based on the clustering process (step 410). Furthermore, the computer generates a plurality of peer groups of users based on determining the similar activity patterns in each distinct time interval (step 412).

The computer also maps respective peer groups of users performing similar patterns of activity to respective job roles within an enterprise (step 414). The computer detects anomalous user behavior based on a user activity change in a respective peer group of users within a distinct time interval (step 416). However, the computer suppresses an alert in response to the user activity change in the respective peer group of users being a result of an assignment of the respective peer group of users to a new set of activities or tasks within the enterprise (step 418). Thereafter, the process terminates.

Figure 5:
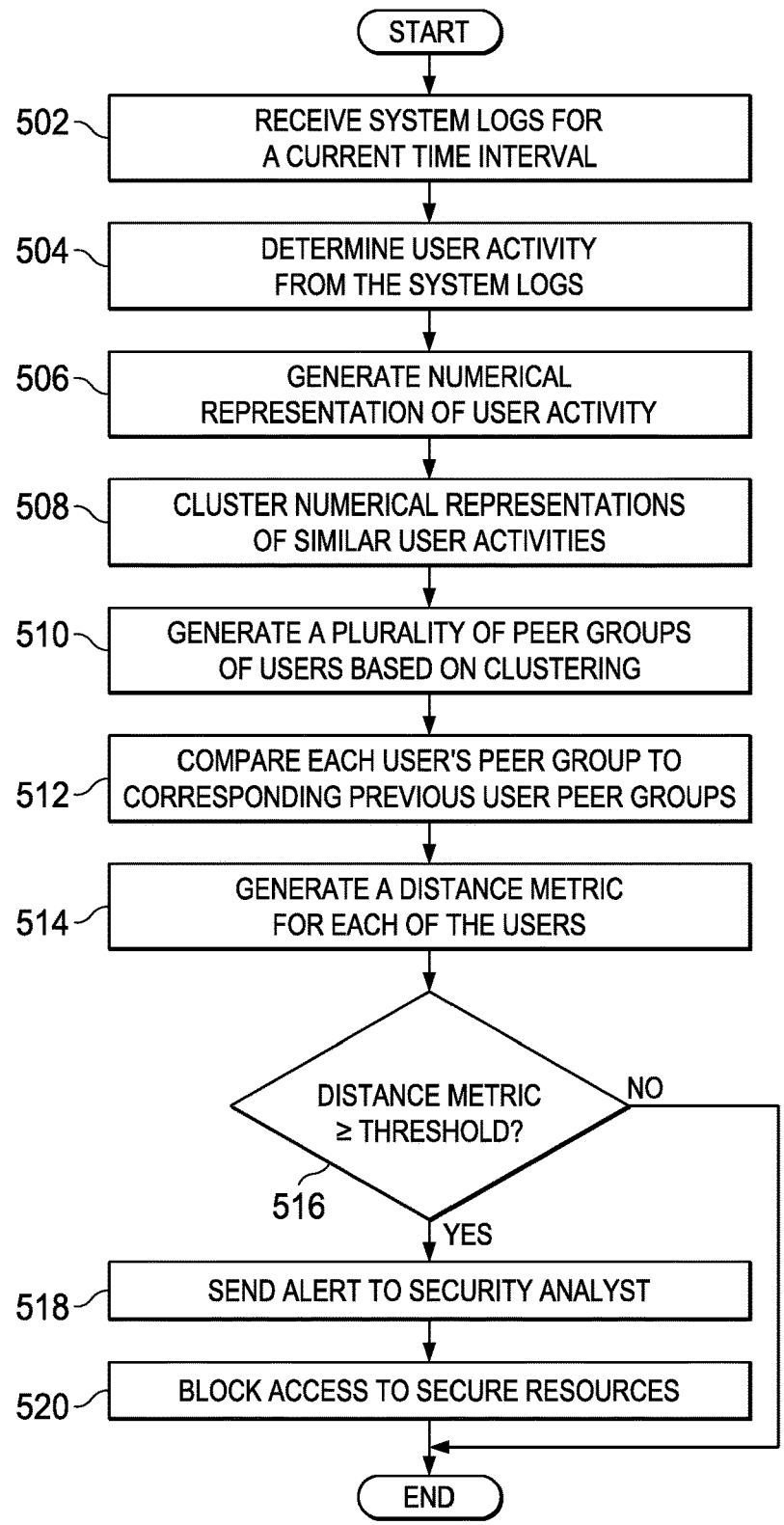
FIG. 5 is a flowchart illustrating a process for managing secure resource access in accordance with an illustrative embodiment.

With reference now to FIG. 5, a flowchart illustrating a process for managing secure resource access is shown in accordance with an illustrative embodiment. The process shown in FIG. 5 may be implemented in a computer, such as, for example, server 104 in FIG. 1 or data processing system 200 in FIG. 2.

The process begins when the computer receives system logs from a plurality of client devices corresponding to a plurality of users within an enterprise during a current time interval (step 502). The system logs may be any type of log that records activities of client device users. The computer determines user activity corresponding to each user of the plurality of users during the current time interval based on analyzing the system logs (step 504). The computer may analyze the system logs using natural language processing, for example.

Subsequently, the computer generates a numerical representation of the user activity corresponding to each user of the plurality of users during the current time interval (step 506). In addition, the computer clusters numerical representations of similar user activities corresponding to the plurality of users during the current time interval (step 508).

Further, the computer generates a plurality of peer groups of users from the plurality of users within the current time interval based on clustering the numerical representations of similar user activities (step 510).

The computer compares each user's peer group within the current time interval to one of that user's peer group in a previous time interval or aggregated user peer groups corresponding to that user over a predetermined number of previous time intervals (step 512). Afterward, the computer generates a distance metric for each user within the current time interval based on comparing (step 514).

Then, the computer makes a determination as to whether the distance metric corresponding to one or more users within the current time interval is greater than or equal to a defined distance metric threshold value (step 516). If the computer determines that the distance metric corresponding to respective users within the current time interval is less than the defined distance metric threshold value, no output of step 516, then the process terminates thereafter. If the computer determines that the distance metric corresponding to one or more respective users within the current time interval is greater than or equal to the defined distance metric threshold value, yes output of step 516, then the computer sends an alert to a security analyst of the enterprise regarding the one or more respective users within the current time interval meeting or exceeding the defined distance metric threshold value (step 518). Moreover, the computer blocks access to secure enterprise resources by a set of one or more users in the one or more respective users within the current time interval until secure resource access authorization for one or more of the set of users is received from the security analyst (step 520). Thereafter, the process terminates.

Thus, illustrative embodiments of the present invention provide a computer-implemented method, computer system, and computer program product for detecting anomalous user behavior in a network based on clustering numerical representations of user activities into peer groups of users having similar types of activities within a defined time interval. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting anomalous user behavior in a network, the computer-implemented method comprising:

logging, by a computer, user activity of a set of users in the network;

dividing, by the computer, the user activity into distinct time intervals;

for each distinct time interval, transforming, by the computer, logged user activity data to a numerical representation of each user's activities for that distinct time interval;

using, by the computer, a clustering process on the numerical representations of user activities to determine which users have similar activity patterns in each distinct time interval;

generating, by the computer, a plurality of peer groups of clustered users based on determining the similar activity patterns in each distinct time interval;

generating, by the computer, a distance metric for each user in the plurality of peer groups of clustered users within a current time interval based on comparing a position of each user in the plurality of peer groups of clustered users in the current time interval with positions of each same user over a predetermined plurality of preceding time intervals;

determining, by the computer, whether a generated distance metric corresponding to one or more users within the current time interval is greater than or equal to a defined distance metric threshold value; and responsive to the computer determining that the generated distance metric corresponding to one or more users within the current time interval is greater than or equal to the defined distance metric threshold value, detecting, by the computer, anomalous user behavior that indicates a security threat by the one or more users to one or more secure resources protected by the computer in the network within the current time interval and blocking, by the computer, access to the one or more secure resources by the one or more users.

2. The computer-implemented method of claim 1 further comprising:

mapping, by the computer, respective peer groups of clustered users performing similar patterns of activity to respective job roles within an enterprise.

3. The computer-implemented method of claim 1 further comprising:

suppressing, by the computer, an alert in response to a user activity change in a respective peer group of clustered users being a result of an assignment of the respective peer group of clustered users to a new set of activities within an enterprise.

4. The computer-implemented method of claim 1 further comprising:

receiving, by the computer, system logs from client devices corresponding to the set of users during the current time interval; and determining, by the computer, user activity corresponding to each user in the set of users during the current time interval based on analyzing the system logs.

5. The computer-implemented method of claim 1 further comprising:

comparing, by the computer, each user's peer group within the current time interval to aggregated user peer groups corresponding to that user over a predetermined plurality of previous time intervals.

6. The computer-implemented method of claim 1 further comprising:

responsive to the computer determining that the generated distance metric corresponding to the one or more users within the current time interval is greater than or equal to the defined distance metric threshold value, sending, by the computer, an alert indicating the anomalous user behavior by the one or more users to a security analyst.

7. The computer-implemented method of claim 1, wherein the distance metric is a Jaccard distance value.

8. The computer-implemented method of claim 1, wherein the computer utilizes a machine learning component to convert the logged user activity data to the numerical representations.

9. The computer-implemented method of claim 1, wherein the numerical representation is a numeric feature vector representing user activity for a user in a distinct time interval.

10. A computer system for detecting anomalous user behavior in a network, the computer system comprising:

a bus system;

a storage device connected to the bus system, wherein the storage device stores program instructions; and a processor connected to the bus system, wherein the processor executes the program instructions to:

log user activity of a set of users in the network;

divide the user activity into distinct time intervals;

for each distinct time interval, transform logged user activity data to a numerical representation of each user's activities for that distinct time interval;

use a clustering process on the numerical representations of user activities to determine which users have similar activity patterns in each distinct time interval;

generate a plurality of peer groups of clustered users based on determining the similar activity patterns in each distinct time interval;

generate a distance metric for each user in the plurality of peer groups of clustered users within a current time interval based on comparing a position of each user in the plurality of peer groups of clustered users in the current time interval with positions of each same user over a predetermined plurality of preceding time intervals;

determine whether a generated distance metric corresponding to one or more users within the current time interval is greater than or equal to a defined distance metric threshold value; and detect anomalous user behavior that indicates a security threat by the one or more users to one or more secure resources protected by the computer in the network within the current time interval and block access to the one or more secure resources by the one or more users in response to determining that the generated distance metric corresponding to one or more users within the current time interval is greater than or equal to the defined distance metric threshold value.

11. The computer system of claim 10, wherein the processor further executes the program instructions to:

map respective peer groups of clustered users performing similar patterns of activity to respective job roles within an enterprise.

12. The computer system of claim 10, wherein the processor further executes the program instructions to:

suppress an alert in response to a user activity change in a respective peer group of clustered users being a result of an assignment of the respective peer group of clustered users to a new set of activities within an enterprise.

13. A computer program product for detecting anomalous user behavior in a network, the computer program product comprising a computer readable storage medium having program instructions embodied therewith, the program instructions executable by a computer to cause the computer to perform a method comprising:

logging, by the computer, user activity of a set of users in the network;

dividing, by the computer, the user activity into distinct time intervals;

for each distinct time interval, transforming, by the computer, logged user activity data to a numerical representation of each user's activities for that distinct time interval;

using, by the computer, a clustering process on the numerical representations of user activities to determine which users have similar activity patterns in each distinct time interval;

generating, by the computer, a plurality of peer groups of clustered users based on determining the similar activity patterns in each distinct time interval;

generating, by the computer, a distance metric for each user in the plurality of peer groups of clustered users within a current time interval based on comparing a position of each user in the plurality of peer groups of clustered users in the current time interval with positions of each same user over a predetermined plurality of preceding time intervals;

determining, by the computer, whether a generated distance metric corresponding to one or more users within the current time interval is greater than or equal to a defined distance metric threshold value; and responsive to the computer determining that the generated distance metric corresponding to one or more users within the current time interval is greater than or equal to the defined distance metric threshold value, detecting, by the computer, anomalous user behavior that indicates a security threat by the one or more users to one or more secure resources protected by the computer in the network within the current time interval and blocking, by the computer, access to the one or more secure resources by the one or more users.

14. The computer program product of claim 13 further comprising:

mapping, by the computer, respective peer groups of clustered users performing similar patterns of activity to respective job roles within an enterprise.

15. The computer program product of claim 13 further comprising:

suppressing, by the computer, an alert in response to a user activity change in a respective peer group of clustered users being a result of an assignment of the respective peer group of clustered users to a new set of activities within an enterprise.

16. The computer program product of claim 13 further comprising:

receiving, by the computer, system logs from client devices corresponding to the set of users during the current time interval; and determining, by the computer, user activity corresponding to each user in the set of users during the current time interval based on analyzing the system logs.

17. The computer program product of claim 13 further comprising:

comparing, by the computer, each user's peer group within the current time interval to aggregated user peer groups corresponding to that user over a predetermined plurality of previous time intervals.

18. The computer program product of claim 13 further comprising:

responsive to the computer determining that the generated distance metric corresponding to the one or more users within the current time interval is greater than or equal to the defined distance metric threshold value, sending, by the computer, an alert indicating the anomalous user behavior by the one or more users to a security analyst.

* * * * *